United States Patent
Ryai, Sr.

(10) Patent No.: US 8,585,029 B2
(45) Date of Patent: Nov. 19, 2013

(54) KEY CLAMPING DEVICE

(75) Inventor: Richard W. Ryai, Sr., North Royalton, OH (US)

(73) Assignee: Hy-Ko Products, Northfield, OH (US)

(*) Notice: Subject to any disclaimer, the term of this patent is extended or adjusted under 35 U.S.C. 154(b) by 733 days.

(21) Appl. No.: 12/583,856

(22) Filed: Aug. 27, 2009

(65) Prior Publication Data

US 2010/0052234 A1   Mar. 4, 2010

Related U.S. Application Data

(60) Provisional application No. 61/190,233, filed on Aug. 27, 2008.

(51) Int. Cl.
*B23C 3/35* (2006.01)

(52) U.S. Cl.
USPC ............ 269/257; 269/41; 269/303; 269/315; 409/81

(58) Field of Classification Search
USPC ......... 269/104, 105, 118, 140–142, 145, 155, 269/234, 257, 271–275, 40, 41, 43, 45, 56, 269/81, 9; 408/103, 108
See application file for complete search history.

(56) References Cited

U.S. PATENT DOCUMENTS

| | | | | |
|---|---|---|---|---|
| 1,371,617 A | * | 3/1921 | Germanow | 269/155 |
| 2,062,326 A | * | 12/1936 | Nelson | 269/98 |
| 2,535,450 A | * | 12/1950 | O'Malley | 269/43 |
| 2,564,138 A | * | 8/1951 | Walker Locko | 269/138 |
| 2,646,708 A | * | 7/1953 | Nickas, Jr | 269/279 |
| 2,679,178 A | * | 5/1954 | Odin | 269/71 |
| 2,949,947 A | * | 8/1960 | Story John D | 269/147 |
| 4,133,519 A | * | 1/1979 | Shin et al. | 269/247 |
| 4,614,465 A | * | 9/1986 | Wu | 409/81 |
| 4,685,663 A | * | 8/1987 | Jorgensen | 269/244 |
| 4,706,949 A | * | 11/1987 | Dossey et al. | 269/283 |
| 4,874,156 A | * | 10/1989 | Goldzweig | 269/158 |
| 5,076,554 A | * | 12/1991 | Nishimura | 269/282 |
| 5,538,374 A | * | 7/1996 | Cole et al. | 409/132 |

(Continued)

FOREIGN PATENT DOCUMENTS

EP          362007 A2 * 4/1990

OTHER PUBLICATIONS

"Geometry". Meriam-Webster's Collegiate Dictionary. Tenth Edition. 1993.*

(Continued)

*Primary Examiner* — Lee D Wilson
*Assistant Examiner* — Tyrone V Hall, Jr.
(74) *Attorney, Agent, or Firm* — McDonald Hopkins LLC

(57) ABSTRACT

A clamping device comprising for clamping a plurality of key styles is provided. The clamping device includes a base block and a clamping block rotatably connected to the base block. The clamping block may include a plurality of sides configured to clamp a key between the clamping block and the base block. A sidewinder key clamp may be connected to the clamping device. The sidewinder key clamp may be capable of clamping a first style of key in a horizontal position and clamping a second style of key in a vertical position. The clamping device may further include a multi-faced block with a plurality sides rotatably connected to the clamping block. Each side of the multi-faced block may have a geometry configured to clamp a key between the multi-faced block and the base block.

20 Claims, 5 Drawing Sheets

(56) References Cited

U.S. PATENT DOCUMENTS

| | | | | |
|---|---|---|---|---|
| 5,551,676 | A | * | 9/1996 | Tibbet ............... 269/43 |
| 5,906,365 | A | * | 5/1999 | Wu .................. 269/43 |
| 6,196,536 | B1 | * | 3/2001 | Hintze ............... 269/282 |
| 6,641,339 | B2 | * | 11/2003 | Chies et al. ........ 409/81 |
| 6,672,578 | B1 | * | 1/2004 | Martens ............. 269/282 |
| 7,163,364 | B2 | * | 1/2007 | Foscan et al. ....... 409/81 |
| 2007/0217880 | A1 | * | 9/2007 | Ryai ................. 409/81 |
| 2008/0203644 | A1 | * | 8/2008 | DaSilva ............. 269/309 |
| 2010/0059916 | A1 | * | 3/2010 | Pigatti .............. 269/157 |

OTHER PUBLICATIONS

"Framon Sidewinder", Aug. 22, 2007. Framon Manufacturing. Mar. 5, 2012. <http://www.framon.com>.*

* cited by examiner

KEY CLAMPING DEVICE

CROSS-REFERENCE TO RELATED APPLICATIONS

This application claims benefit from U.S. Provisional Patent Application No. 61/190,233, entitled "Key Clamping Mechanisms," filed on Aug. 27, 2008 which is hereby incorporated by reference in its entirety.

BACKGROUND

The present invention relates generally to clamping devices for key cutting machines, and particularly, to multi-faced clamping blocks that provide various surfaces for clamping different types of keys.

Key cutting machines are known to generally include a clamp in which a key blank is inserted and clamped for subsequent cutting by a milling operation. Conventional key cutting machines often include two such clamps: one for holding an original key already having the desired mechanical code cut therein, and one for holding a key blank to be cut. More recent key cutting machines include only one clamp for holding the key blank, as all of the cutting information may be stored electronically.

Keys come in many different styles, such as house keys and car keys, sidewinder keys, tubular keys, and other various types and styles of keys. Depending on its size and shape, each style of key may require a different clamping mechanism to properly hold the key blank in place while the key cutting machine cuts the appropriate bitting pattern into the key blank. Furthermore, depending on the design of the key cutting machine, different keys may require different clamping orientations, such as parallel or perpendicular to the cutting machine, in order to properly engage the cutting tool during the key cutting process.

Many conventional keys, such as house keys and car keys, are traditionally flat, and include a blade portion and a base portion. Such conventional keys come in various lengths and widths, and have any number of different grooves along the blade of the key. To properly hold a standard key in place while it is being cut, the blocks that engage and clamp the key must align with the key's length, width and groove configuration. Thus, for a key cutting machine to be capable of cutting various types of keys, it must have multiple clamping surfaces for properly clamping each type of key.

Previous key cutting machines have failed to provide key clamps capable of adjusting to clamp various types and styles of keys. Therefore, there is a need in the field for a key clamping mechanism that is able to clamp keys of various styles and configurations without removing and reattaching parts of the key cutting machine.

DESCRIPTION OF THE DRAWINGS

Objects and advantages together with the operation of the invention may be better understood by reference to the following detailed description taken in connection with the following illustrations, wherein.

SUMMARY

A clamping mechanism comprising for clamping a plurality of key styles is provided. The clamping mechanism includes a base block and a clamping block rotatably connected to the base block. The clamping block may include a plurality of sides configured to clamp a key between the clamping block and the base block. A sidewinder key clamp may be connected to the clamping mechanism. The sidewinder clamp includes a sidewinder base and a sidewinder clamp connected to the sidewinder base. The sidewinder key clamp is capable of clamping a first key, such as a sidewinder key, in a horizontal position and clamping a second key, such as a tubular key, in a vertical position.

The clamping mechanism may include a multi-faced block with a plurality sides connected to the clamping block. Each side of the multi-faced block may have a geometry configured to clamp a key between the multi-faced block and the base block. The multi-faced block may be rotatable with respect to the clamping block to selectively adjust the clamping surface.

DETAILED DESCRIPTION

While the invention is described with reference to key cutting machines, it will be appreciated that the invention should not be limited to such uses or embodiments. The description herein is merely illustrative of embodiments of the invention and in no way should limit the scope of the invention.

A key clamping device 10 capable of clamping various configurations of keys is provided. A given key cutting machine may include one, two, or any number of key clamping devices 10, depending on the design of the machine. A clamping device 10 may be used to hold a key, such as a master key having a bitting pattern cut into the blade or a key blank having an uncut blade. A key cutting machine may include a carriage 8 to connect two or more key clamping devices 10.

Figure 1:
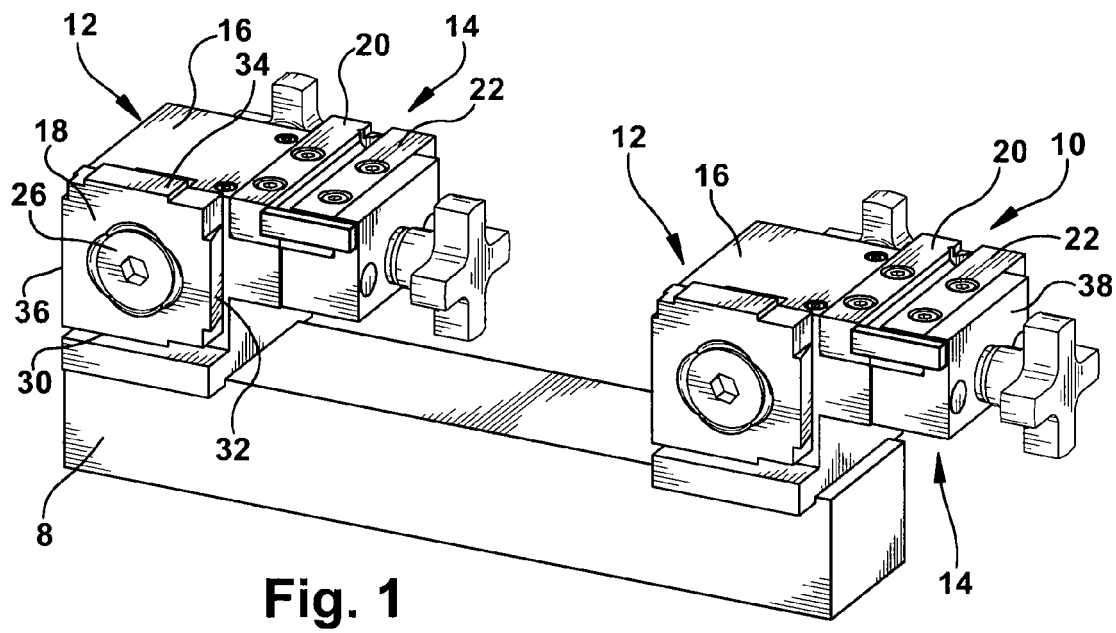
FIG. 1 is a front perspective view of a clamping device having a sidewinder attachment.
Figure 2:
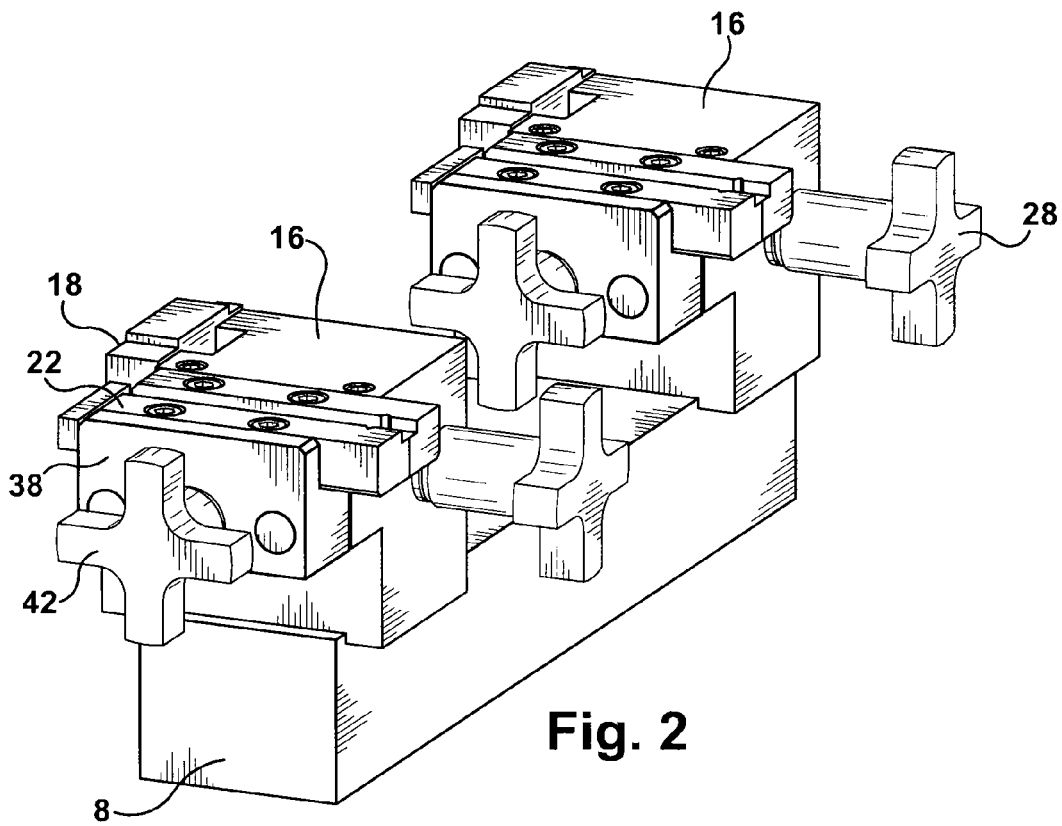
FIG. 2 is a rear perspective view of a clamping device having a sidewinder attachment.

With reference to FIGS. 1-6, a clamping device 10 is shown. The clamping device 10 includes a key clamp 12 and a sidewinder key clamp 14. The key clamp 12 consists of a base block 16 connected to a clamping block 18. The sidewinder key clamp consists of a sidewinder base 20 connected to a sidewinder clamp 22. As illustrated in FIG. 1, the key clamp 12 and sidewinder key clamp 14 may be fixed together, perpendicular to one another, to form a single clamping device 10 capable of clamping multiple styles of keys. It will be appreciated, however, that the sidewinder key clamp 14 may be arranged parallel, perpendicular, or in any configuration with respect to the key clamp 12.

Figure 5:
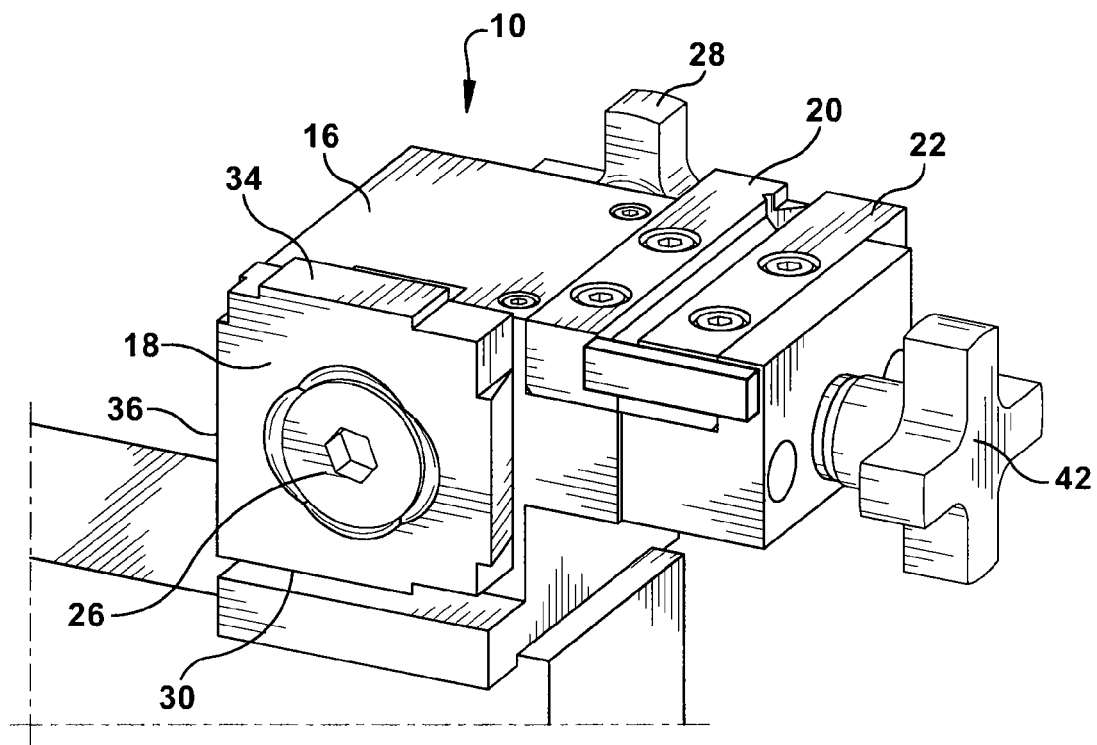
FIG. 5 is an enlarged perspective view of a clamping device having a sidewinder attachment.
Figure 6:
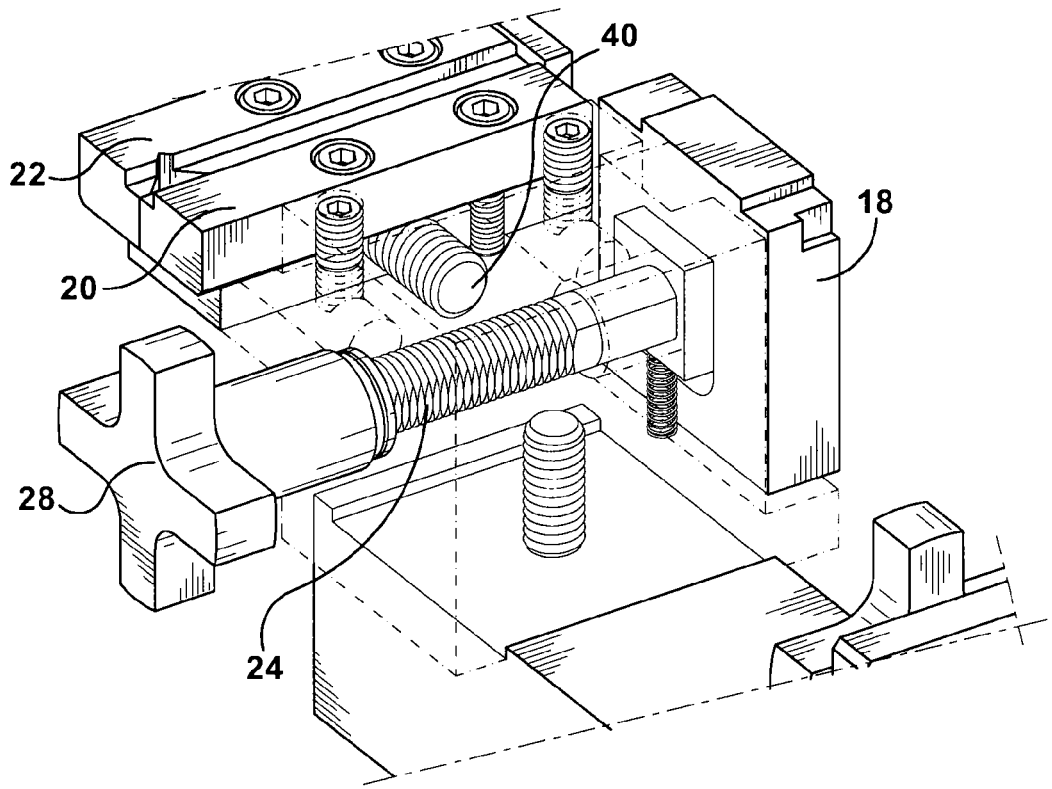
FIG. 6 is a translucent perspective view of a clamping device having a sidewinder attachment.

The key clamp 12 is capable of clamping a conventional key between the base block 16 and the clamping block 18. For example, the base block 16 and clamping block 18 may act as upper and lower jaws to clamp and hold a key in place. As illustrated in FIGS. 5 and 6, the clamping block 18 may be connected to the base block 16 by a bolt 24 inserted there-through. The bolt 24 may extend from a first knob 28 through the base block 16 and through the clamping block 18. The bolt 24 may be secured to the clamping block 18 by a nut 26, or may be secured to the clamping block 18 by a friction fit, weld joint, or by any other manner known in the art.

The bolt 24 may be threaded to allow the clamping block 18 to move relative to the base block 16. For example, the first knob 28 may be rotatable in a first direction, such as counterclockwise, to loosen the clamp and increase the space between the clamping block 18 and the base block 16. A key to be clamped may be placed in an opening between the base block 16 and the clamping block 18. The first knob 28 may then be rotated in a second direction, opposite the first direction, until the key is tightened into place. While the standard key clamp 12 is described herein as including a bolt 24 to connect clamping block 18 to the base block 16, it will be appreciated that the clamping block 18 may be connected to the base block 16 without a bolt. For example, clamping block 18 and base block 16 may be rotatably connected, removably connected, magnetically connected, or otherwise connected in any manner. Alternatively As is known in the art, key blanks are often cut to match the bitting pattern of a master key. To cut the blade of the key blank, a portion of the key blade must be exposed and accessible to a cutting device. Thus, a bottom portion of the key blank may be clamped between base block 16 and the clamping block 18, allowing a top portion of the key blade to remain exposed and accessible to a cutting device. The geometry of the side face 30 must align with the geometry of a first side of the key blade lower portion to prevent the key from slipping. Further, a portion of the base block 16 may be sized and shaped to correspond to the geometry of the opposite side of the key blank lower portion.

FIG. 5 illustrates a clamping block 18 with four side faces 30, 32, 34 and 36. Each side of the clamping block 18 may have a different geometry, specifically designed to align with a different type of key. For example, the first face 30 may be a narrow face, the second face 32 may be a standard face, the third face 34 may be a wide face, and the fourth face 36 may be an X face, each to engage a key having similar geometry. While these faces are commonly used in the field, it is appreciated that other face configurations may be implemented on the clamping block 18. Moreover, while the clamping block 18 is described as having four sides, it will be appreciated that the clamping block 18 may have any number of sides.

The clamping block 18 may be adjusted to align a face corresponding with a key to be clamped with the base block. For example, the clamping block 18 may be rotated by turning the first knob 28 to increase the space between the base block 16 and the clamping block 18, thus loosening the key clamp 12. Once the key clamp 12 is loose, the clamping block 18 may be moved away from the base block 16 and rotated until the desired face is adjacent to the base block 16. A key may be placed between the face 30 and the base block 16. For example, a key may be place between the face 30 and a protruding portion of the base block 16. The first knob 28 may be rotated to tighten the key clamp 12. The key clamp 12 may further include a spring member (not shown) between the base block 16 and the clamping block 18. The spring member may allow the clamping block 18 to be partially separated from the base block 16 and rotated to select the desired face. For example, the bolt 24 may be spring loaded and moveable within the base block 16 to allow the clamping block 18 to be pulled away from the base block 16 and rotated with respect thereto.

The clamping device 10 may also include a sidewinder key clamp 14, connected to the key clamp 12. The sidewinder key clamp 14 may be used for clamping tubular keys, sidewinder keys, or other keys that require similar alignment. As used herein, the term sidewinder keys refers to high-security keys or automotive keys that include dimples or grooves cut into the blade, or other such keys with similar configurations and designs. The sidewinder key clamp 14 may include a sidewinder base 20 connected to the base block 16, a support block 38 connected to the base block 16, and a sidewinder clamp 22. The sidewinder clamp 22 may be fixed to the support block 38, between the support block 38 and the sidewinder base 20.

As illustrated in FIGS. 5 and 6, the support block 38 may be connected to the base block 16 by a threaded bolt 40, similar to the standard key clamp 12. At one end, the bolt 40 may be inserted through a side of the base block 16. At the other end, the bolt 40 extends through the support block 38 and is connected to a second knob 42. Similar to the standard key clamp 12, the sidewinder key clamp 14 may be tightened or loosened by rotating the second knob 42 clockwise or counterclockwise. When the sidewinder key clamp is loosened, a key may be inserted between the sidewinder base 20 and the sidewinder clamp 22 and held horizontally in a first position. The sidewinder key clamp 14 may then be tightened to clamp the key into place. Keys may be clamped in the sidewinder key clamp in various positions, including face down, with the blade of the key facing down, or standing up, with the notched portion of the key facing up.

Figure 3:
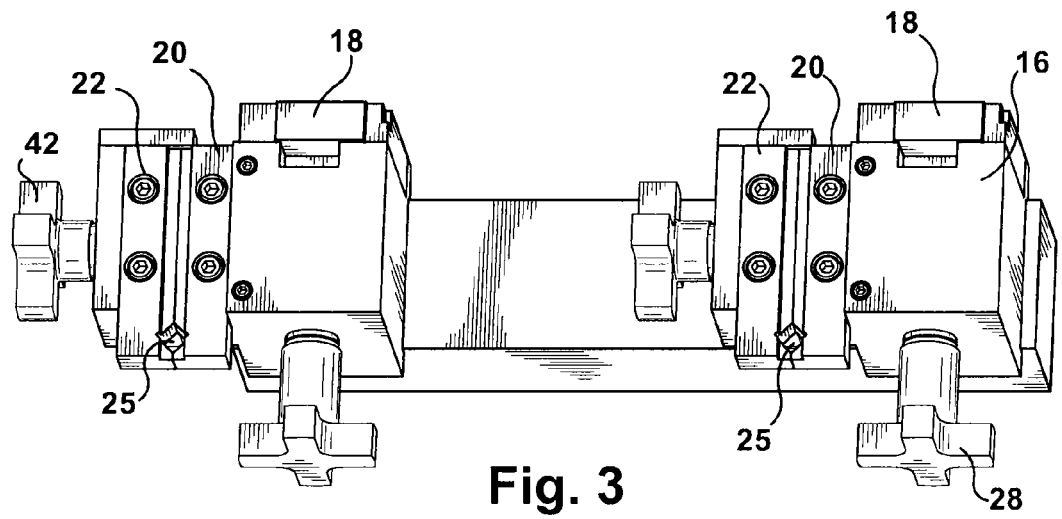
FIG. 3 is a top perspective view of a clamping device having a sidewinder attachment.
Figure 4:
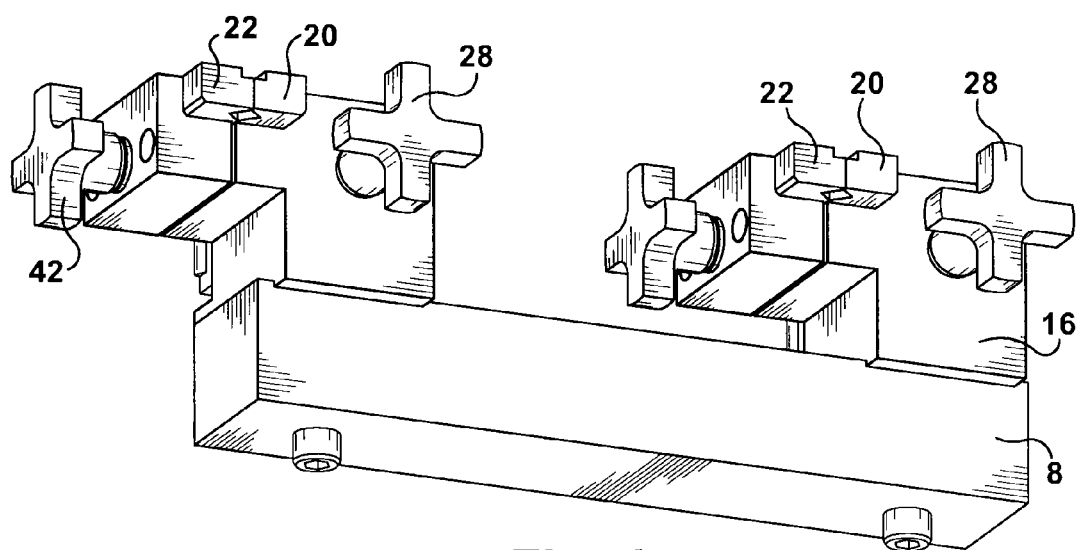
FIG. 4 is a bottom perspective view of a clamping device having a sidewinder attachment.

The sidewinder key clamp 14 may further include a notch 25 configured to hold a key in a vertical second position, perpendicular to the horizontal first position. As best shown in FIG. 3, the notch 25 may be shaped to correspond to a specific portion of a key to be clamped. For example, a tubular key may include a v-shaped portion and may be positioned within the notch 25. The second knob 42 may then be rotated to close the sidewinder key clamp 14 and hold the tubular key in a vertical position.

Figure 7:
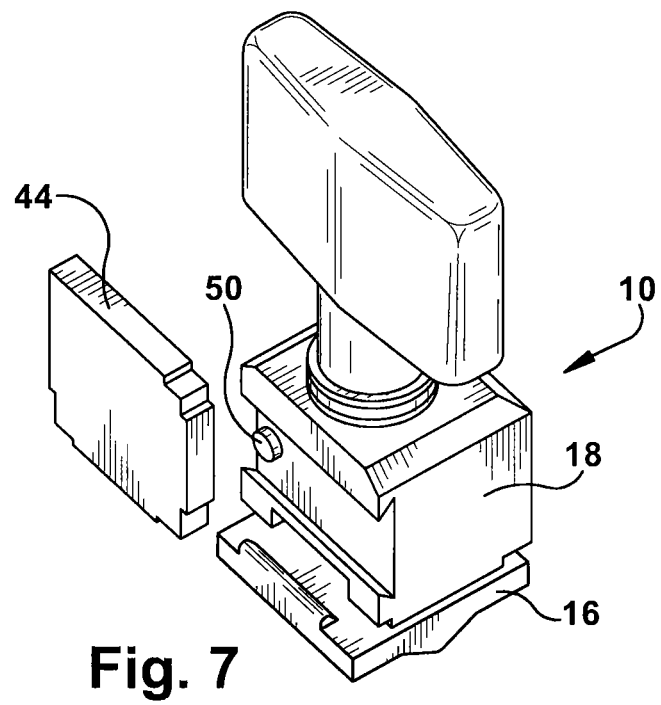
FIG. 7 is a side perspective view of a clamping device having a multi-faced block.
Figure 8:
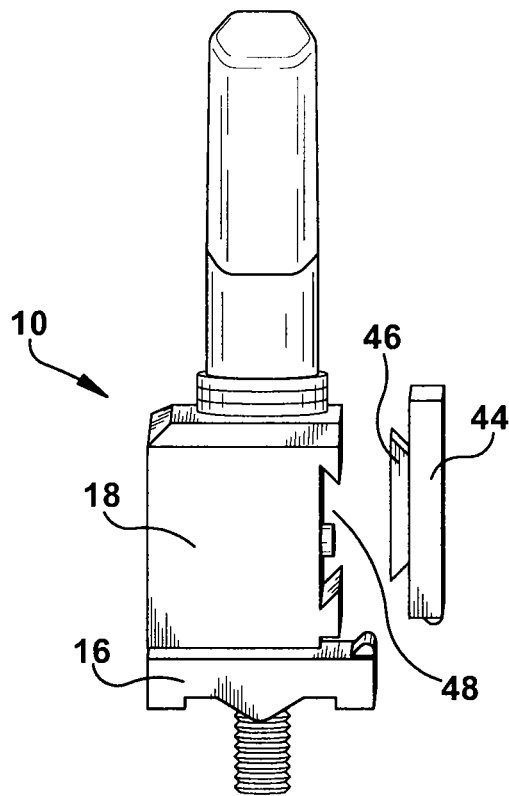
FIG. 8 is a side view of a clamping device having a multi-faced block.

In an embodiment, illustrated in FIGS. 7-8, the clamping device 10 may include a multi-faced block 44 connected to the clamping block 18. The multi-faced block 44 may provide additional surfaces having geometries corresponding to keys to be clamped. The multi-faced block 44 may be rotatable with respect to the clamping block 18 to be selectively adjustable. For example, the multi-faced block 44 may include a protrusion 46, extending from its surface, as best shown in FIG. 8. The clamping block 18 may include a recessed slot 48 sized and shaped to receive the protrusion 46. The protrusion 46 and slot 48 may be dovetail shaped, as shown in FIG. 8, or any other shaped to permit engagement of the multi-faced block 44 to the clamping block 18. The clamping block 18 may further include a stop 50 to position the multi-faced block 44 within the slot 48. Alternatively, the multi-faced block 44 may be connected to the clamping block 18 by a pin (not shown), a spring (not shown), a screw or bolt (not shown), or any other means known in the art.

The multi-faced block 44 may be rotated with respect to the clamping block 18. For example, the multi-faced block 44 may be removed from the slot 48, rotated to select the desired face, and reinserted into the slot 48 to provide a new clamping surface. Alternatively, the multi-faced block 44 may be unscrewed or turned about an axis, bolt, or pin to provide a new clamping surface.

The base block 16 and clamping block 18 may connected to the carriage 8 and configured to rotate together with respect to the carriage 8 to provide multiple clamping surfaces. For example, the upper face of each side the base block 16 may include a specific geometry to engage a portion of a key. Thus, each side of the base block 16 and clamping block 18 may form a unique clamping combination. The base block 16 and clamping block 18 may be rotated with respect to the carriage 8 to select the desired clamp corresponding to a key to be clamped. The base block 16 and clamping block 18 may provide any number of clamping surfaces, depending on the number of sides of the base and clamping blocks 16, 18. Further, the number of clamping surfaces may be increased by including a multi-faced block 44 on one or more sides of the clamping block 18.

Figure 9:
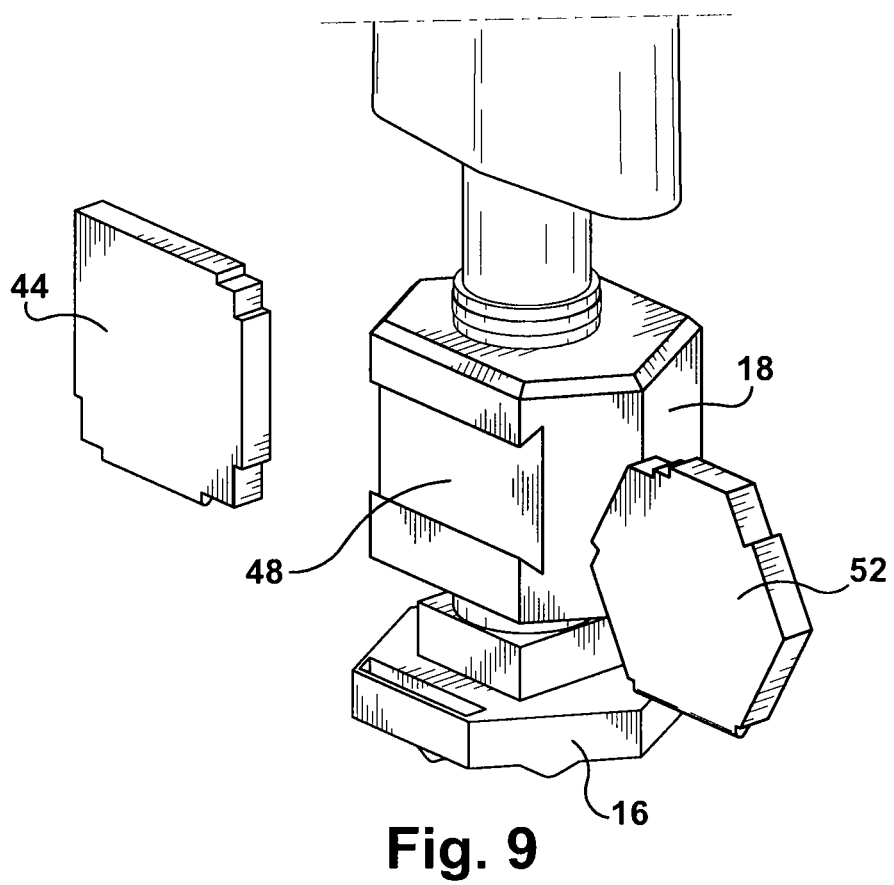
FIG. 9 is a perspective view of a clamping device having a four sided and a six sided multi-face block.

The multi-faced block 44 may include any number, each with a different geometry corresponding to a specific key configuration. By rotating the multi-faced block 44, a single side of a clamping block 18 may be capable of clamping various styles of keys. The number of clamping surfaces may be increased by using a multi-faced block 44 with a greater number of sides. For example, as illustrated in FIG. 9, a multi-faced block 44 having four sides may be replaces with a multi-faced block 52 having six sides. Multi-faced blocks 44 may also be included on additional sides of the clamping block to increase the clamping surfaces. Further, the base block 16 and clamping block 18 may have more sides, such as six sides, to allow for a greater number of clamping surfaces.

The embodiments of the invention have been described above and, obviously, modifications and alternations will occur to others upon reading and understanding this specification. The claims as follows are intended to include all modifications and alterations insofar as they come within the scope of the claims or the equivalent thereof.

I claim:

1. A clamping device comprising:
a base block;
a clamping block rotatably connected to said base block, said clamping block having a plurality of sides, each side having a geometry configured to engage the blade of a key between said clamping block and said base block;
a sidewinder base connected to said base block;
a sidewinder clamp adjustably connected to said sidewinder base;
wherein said sidewinder clamp is configured to clamp a key between said sidewinder clamp and said sidewinder base in a first position, and further wherein said sidewinder clamp is configured to clamp a key between said sidewinder clamp and said sidewinder base in a second position, perpendicular to said first position;
a multi-faced block connected to said clamping block, said multi-faced block having a plurality of sides that include geometry configured to clamp a key between said multi-faced block and said base block; and
wherein said clamping device is connected to a key cutting machine having a cutting wheel positioned to cut a key held between said clamping block and said base block.

2. The clamping device of claim 1 further comprising a notch in said sidewinder clamp configured to hold a key in said second position.

3. The clamping device of claim 2 further comprising a bolt connecting said clamping block to said base block.

4. The clamping device of claim 2 further comprising a spring connecting said clamping block to said base block.

5. The clamping device of claim 3 wherein said bolt is threaded.

6. The clamping device of claim 5 further comprising a handle connected to said bolt, wherein turning said handle in a first direction loosens the connection between said clamping block and said base block, and turning said handle in a second direction tightens the connection between said clamping block and said base block.

7. The clamping device of claim 1 wherein said clamping block includes four sides.

8. The clamping device of claim 7 wherein each side of said clamping block includes a different geometry.

9. The clamping device of claim 1 wherein said sidewinder clamp is connected to said sidewinder base by a bolt.

10. A clamping device comprising:
a base block;
a clamping block connected to said base block, said clamping block including a plurality of sides each side having a geometry configured to engage the blade of a key between said clamping block and said base block;
a multi-faced block connected to said clamping block, said multi-faced block having a plurality of sides that include geometry configured to clamp a key between said multi-faced block and said base block; and
wherein said multi-faced block is selectively connectable to said clamping block at a plurality of orientations to selectively position any one of said plurality of sides adjacent to said base block.

11. The clamping device of claim 10 further comprising a slot in said clamping block configured to receive a protruding portion of said multi-faced block.

12. The clamping device of claim 11, wherein the shape of said protruding portion substantially matches the shape of said slot.

13. The clamping device of claim 10, wherein said multi-faced block has four sides.

14. The clamping mechanism of claim 13, wherein each of said four sides of said multi-faced block includes a different geometry configured to clamp a key.

15. The clamping device of claim 14 further comprising a second multi-faced block connected to said clamping block, wherein at least two sides of said second multi-faced block include a geometry configured to clamp a key between said second multi-faced block and said base block.

16. The clamping device of claim 10, wherein said clamping block is connected to said base block by a bolt.

17. The clamping device of claim 16 further comprising a spring interconnecting said clamping block to said base block.

18. A clamping device comprising:
a base block;
a clamping block rotatably connected to said base block, said clamping block including a plurality of sides each side having a geometry configured to engage the blade of a key between said clamping block and said base block;
a multi-faced block connected to said clamping block, said multi-faced block having a plurality sides, wherein at least two sides of said multi-faced block include a geometry configured to clamp a key between said multi-faced block and said base block;
wherein said multi-faced block is selectively connectable to said clamping block at a plurality of orientations to selectively position any one of said plurality of sides adjacent to said base block;
a sidewinder base connected to said base block;
a sidewinder clamp adjustably connected to said sidewinder base; and
wherein said sidewinder clamp is configured to adjustably clamp a key in a first horizontal position, and further wherein said sidewinder clamp is configured to adjustably clamp a key in a second vertical position, perpendicular to said first horizontal position.

19. The clamping device of claim 18, wherein said clamping block is rotatably connected to said base block by a threaded bolt.

20. The clamping device of claim 18, said multi-faced block having four sides including geometry configured to clamp a key between said multi-faced block and said base block.

\* \* \* \* \*